United States Patent [19]

Hopkinson et al.

[11] Patent Number: 4,596,927
[45] Date of Patent: Jun. 24, 1986

[54] METHOD AND APPARATUS FOR INDUCED GAMMA RAY LOGGING

[75] Inventors: Eric C. Hopkinson; Donald W. Oliver, both of Houston, Tex.

[73] Assignee: Dresser Industries, Inc., Dallas, Tex.

[21] Appl. No.: 469,330

[22] Filed: Feb. 24, 1983

[51] Int. Cl.⁴ .............................................. G01V 5/10
[52] U.S. Cl. .................................... 250/270; 250/262
[58] Field of Search ....................... 250/270, 262, 269

[56] References Cited

U.S. PATENT DOCUMENTS

| | | | |
|---|---|---|---|
| 4,136,278 | 1/1979 | Oliver | 250/270 |
| 4,232,220 | 11/1980 | Hertzog | 250/270 |
| 4,446,369 | 5/1984 | Givens et al. | 250/270 |
| 4,454,420 | 6/1984 | Smith, Jr. | 250/270 |

*Primary Examiner*—Bruce C. Anderson
*Assistant Examiner*—Carolyn E. Fields
*Attorney, Agent, or Firm*—Patrick H. McCollum; Richard M. Byron

[57] ABSTRACT

In a neutron induced gamma ray well logging instrument, a neutron generator is pulsed at a preselected clock frequency. Each neutron burst produces inelastic scattering gamma rays and capture gamma rays. Inelastic scattering gamma rays are detected using a bismuth germanate scintillator during a first time interval coinciding with the neutron source being on. Capture gamma rays are detected by bismuth germanate scintillator during a second interval subsequent to the termination of each neutron burst. The detected pulses are converted into electrical pulses by a photomultiplier. The electrical pulses are coupled into processing circuitry. The use of address decoders, subtractors and ratio circuits enables measurements of the characteristic full-energy photopeaks of selected elements within the formations.

9 Claims, 5 Drawing Figures

METHOD AND APPARATUS FOR INDUCED GAMMA RAY LOGGING

BACKGROUND OF THE INVENTION

This invention relates generally to radiological well logging methods and apparatus for investigating subsurface earth formations traversed by a borehole and, more particularly, to an improved method and apparatus for pulsed neutron gamma ray logging for identifying and measuring elements in subsurface formations.

A number of well logging techniques in use come under the general classification of neutron induced radiological well logging. In their basic form, these techniques involve irradiating subsurface earth formations with high energy neutrons and determining the effects of formation constituents on the irradiating neutrons by measuring gamma rays produced by inelastically scattered neutrons or the gamma rays resulting from thermal neutron capture. In the case of inelastic scattering, part of the energy lost by the irradiating neutrons is released in the form of gamma rays at the instant of collision. Whereas, a capture reaction is where a thermalized neutron is absorbed into the nucleus of an atom and ceases to exist independently. In most such capture reactions, one or more high energy gamma rays are generated.

Typical well logging systems for induced gamma ray logging employ a subsurface instrument including a neutron source for pulsatingly irradiating earth formations and a crystal detector coupled to a photomultiplier tube as a detector system. In the prior art embodiments the crystal portion of the detector system has employed a NaI(Tl) crystal suitably sized to be contained within the elongated housing of the subsurface instrument. While the NaI(Tl) crystal has provided acceptable information, the use of this crystal has proven to be a serious limitation.

The NaI(Tl) crystals employed in the art have a relatively low density resulting in relatively low counting efficiency. Additionally, these crystals, due to pair production characteristics, exhibit a full-energy-to-escape-peak ratio such that the energy bands required to measure a particular formation constituent must be set to encompass a main photopeak and first and second escape peaks. Use of an energy band of such width substantially increases the background contribution to the desired measurement reducing the accuracy thereof.

Accordingly, the present invention provides improved methods and apparatus for measuring and identifying characteristics of subsurface formations from detected gamma radiation resulting from neutron inelastic scattering and thermal neutron capture.

SUMMARY OF THE INVENTION

In a preferred embodiment of the invention, a well logging system is provided which in its overall concept includes a pulsed source of high energy neutrons and a radiation detector system spaced apart therefrom. The detector system comprises a bismuth germanate scintillator cooperatively coupled to a photomultiplier tube. As the logging instrument traverses a borehole, the source is pulsatively activated, thus bombarding the surrounding formations with neutrons. Inelastically scattered gamma rays and capture gamma rays are detected following each neutron burst by the detector crystal. The detected pulses are converted into electrical pulses which are transmitted to surface electronics. The electrical pulses functionally related to the detected gamma radiation are measured during selected gate intervals corresponding to the characteristic full-energy photopeaks of elements within the formations.

Accordingly, it is a feature of the present invention to provide new and improved methods and apparatus for induced gamma ray logging.

It is yet another feature of the present invention to provide new and improved methods and apparatus for induced gamma ray logging having relatively high detection efficiency.

It is still another feature of the present invention to provide new and improved methods and apparatus for detecting gamma radiation emanating from subsurface earth formations exhibiting improved sensitivity between water and oil.

Another feature of the present invention is to provide new and improved gamma ray well logging methods and apparatus having reduced background radiation effects.

The features of the present invention will be more readily understood by those skilled in the art from a reading of the following detailed specification and drawings.

DETAILED DESCRIPTION OF A PREFERRED EMBODIMENT

Figure 1:
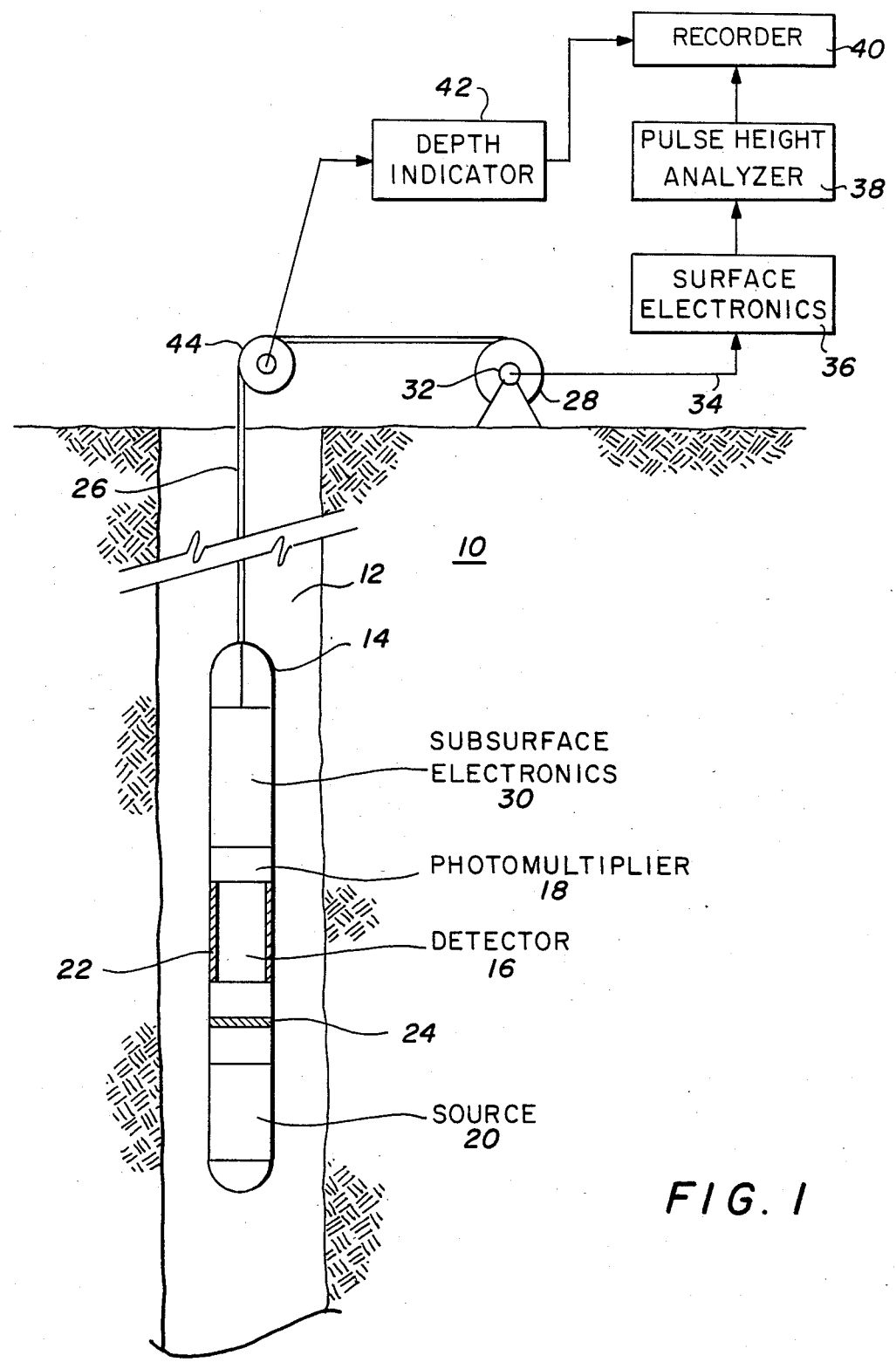
FIG. 1 is a side elevation, partly in cross section, of a borehole logging instrument in operative position and its associated circuitry and related equipment.

Referring now to the drawings in more detail, particularly to FIG. 1, there is illustrated schematically a radioactivity well surveying operation in which a portion of the earth 10 is shown in vertical section. Well 12 penetrates the earth's surface and may or may not be cased. Disposed within well 12 is subsurface instrument 14 of the well logging system having a detector crystal 16, cooperatively coupled to the face of photomultiplier tube 18 with silicone optical grease, and a pulsed neutron source 20, for example, an accelerator source using a D-T reaction to produce fast neutrons. Radiation shield 22 encircles detector crystal 16 and radiation shield 24 is interposed between source 20 and detector crystal 16. Radiation shield 22 preferably is a layer of cadmium material having a thickness from between 10 mils to 20 mils. Cable 26 suspends instrument 14 within well 12 and contains the required conductors for electrical communication between the instrument and the surface apparatus. Cable 26 is wound on or unwound from drum 28 in raising and lowering instrument 14 to traverse well 12.

In making a radioactivity log of the subsurface formations, instrument 14 is caused to traverse well 12. Thereby, high energy neutrons from source 20 irradiate the formations surrounding the borehole and gamma radiations influenced by the formations are detected by detector crystal 16. The detected radiation pulses are converted into electrical pulses by photomultiplier tube 18 and processed by subsurface electronics 30. The resultant electrical signals are transmitted to the surface through cable 26. Through slip rings 32 on the end of drum 28, the electrical signals are coupled by conductor 34 to surface electronics 36, where the signals are processed. The output signals from surface electronics 36 are coupled to pulse height analyzer 38 with the output thereof recorded on recorder 40, as explained in more detail hereinafter. Recorder 40 can be any suitable recording system common in the art such as, for example, an analog film recorder, a digital plotter or suitable data storage. The recorded signals on recorder 40 are functionally correlative with the depth location of instrument 14 by the output signals from depth indicator 42. More particularly, sheave wheel 44 is conventionally coupled to depth indicator 42 which provides electrical output signals in functional relation to the movement of instrument 14 within well 12.

It should be understood that the elements of FIG. 1 are shown diagrammatically and that the associated circuits and power supplies are provided in a conventional manner. It is also to be understood that the subsurface instrument housing will be constructed to withstand the pressure, mechanical and thermal abuses encountered in logging a deep well and to provide adequate space within it to house the necessary apparatus and to permit the transmission of radiation therethrough.

Figure 2:
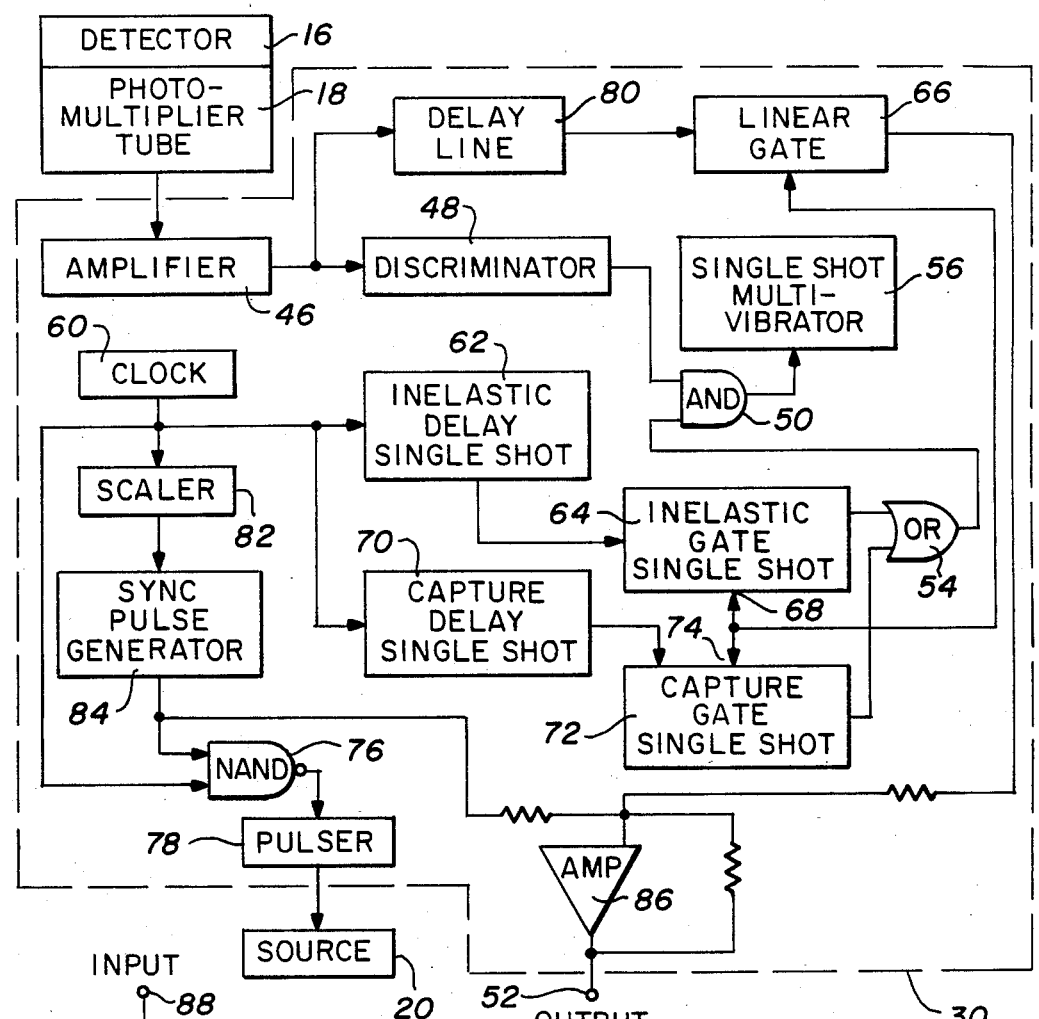
FIG. 2 is a block diagram of a portion of the subsurface circuitry of the instrument.

Referring now to FIG. 2, there is illustrated in block diagram from a portion of the subsurface electronics 30. Detector crystal 16 is a bismuth germanate (BGO) scintillator coupled to the face of photomultiplier tube 18 with silicone optical grease. In the preferred form detector crystal 16 comprises a 2 inch by 4 inch bismuth germanate scintillation detector of the chemical composition $Bi_4Ge_3O_{12}$, such as is available from Harshaw Chemical Company. Photomultiplier tube 18 is a Model No. 4523 available from The Radio Corporation of America. Detector crystal 16 is encircled with a layer of cadmium sheilding and the detector system is mounted in a Dewar flask for protection from temperatures encountered in boreholes.

The bismuth germanate detector crystal 16 provides a scintillator to gamma radiation which exhibits high detection efficiency combined with the physical ruggedness needed for surveying subsurface formations. The crystal benefits from a reduction in secondary or escape energy peaks allowing for measurement intervals substantially restricted to the main photopeaks. Additionally, due to increased detector efficiency less neutron output from source 20 can be used without any degrading of statistical accuracy or a reduced diameter instrument and/or an increased logging speed may be employed.

The output of photomultiplier 18 is coupled into amplifier 46 within the subsurface electronics section 30. The output of amplifier 46 is coupled into discriminator 48 which has an output coupled into one of the two inputs of AND gate 50. Discriminator 48 is used to remove pulses having amplitudes below a selectable threshold value which might otherwise cause pile-up on the transmission line normally connected to output terminal 52. A discriminator setting of 500 kev is generally suitable for this purpose. The output of the discriminator 46 is gated by AND gate 50 with a voltage pulse having a nominal width of ten microseconds coupled into the remaining input thereof from OR gate 54. The output signal from AND gate 50 triggers the single shot multivibrator circuit 56 which is nominally set to have a 1.6 microsecond wide pulse output for controlling the linear gate 66. Clock 60 output signal triggers the inelastic delay single shot multivibrator circuit 62 which in turn triggers the inelastic gate width single shot multivibrator circuit 64. These circuits synchronize the opening of linear gate 66 with the pulsing of the neutron source 20 to provide the inelastic gating interval. Multivibrator 64 is a reinitializing type with a reset input 68. The operation of the circuit is such that if a trigger pulse is applied to input 68 before the end of the cycle initiated by a previous trigger pulse, the cycle time will reset and begin anew. Also, after the circuit is initiated by a trigger pulse, the Q output signal of multivibrator 64 is coupled to one input of OR gate 54. The reset input 68 of single shot 64 is driven by the output of single shot 56. The result of this reset signal is to clear the inelastic gate single shot 64 as soon as the first gamma ray with energy above the discriminator threshold is detected. By using a multivibrator circuit with a reset function for gate single shot 64, a dual function is performed. Firstly, the single shot provides the gate width timing signal for determining the maximum length of the inelastic detection gate, nominally 10 usec; and secondly it provides for terminating the gate when the first gamma ray pulse above the discriminator threshold is detected.

The output from clock 60 is also connected to the capture delay single shot 70 which in turn drives the capture width single shot 72 which also has a reset input 74 and whose output is coupled to the second input of OR gate 54. The reset input terminal 74 of single shot 72 is also driven by the output of single shot 56. Clock 60 output is also used to synchronize the neutron source 20. The pulse from clock 60 actuates, by means of NAND circuit 76, a high voltage pulser 78 arranged to cause the neutron output of source 20 to pulse at the clock frequency, for example, as described in U.S. Pat. No. 3,309,522 which is incorporated herein by reference.

The amplified pulses from amplifier 46 are also coupled into delay line 80, which is nominally set to cause a delay of 0.4 microseconds, the output of which is coupled into linear gate 66. Clock circuit 60 output is also coupled into a scaler circuit 82 which produces output pulses at a frequency scaled down from that of the clock frequency of 20 kHz with scaler circuit 82 producing pulses at a frequency of 200 Hz. Scaler 82 output is coupled into a sync pulse generator 84 which shapes the pulses for application to line amplifier 86 and NAND gate 76. Thus, the scaled sync pulses are generated at a frequency which is 1% of that of clock 60 frequency. The scaled sync pulses from the sync pulse generator 84 are coupled into the second input of NAND gate 76. Thus, whenever a sync pulse appears on NAND gate 76 input coincident with a pulse from the clock circuit 60, there is no output produced from NAND gate 76 and neutron source 20 is not pulsed. In short, source 20 pulses every time clock 60 pulses except for those times when the scaled sync pulses are produced. In addition to the scaled sync pulses, the output from linear gate 66 is coupled to line amplifier 86 which in turn is coupled to cable 26 by connection to terminal 52.

In the operation of the circuitry of FIG. 2, it should be readily apparent that the circuits of multivibrators 70 and 72 are duplicates of the circuits of multivibrators 62 and 64. The difference lies in the time constant associated with each circuit which allows there to be two gating intervals which are separated in a preferred embodiment by a delay of approximately 25 microseconds from the beginning of the first to the beginning of the second. As will be explained hereinafter, the first gating interval occurs during the time the neutron source 20 is turned on and allows for the detection of radioactivity resulting from inelastic scattering and the second gating interval allows for the measurement of neutron capture resulting from the pulsing of the neutron source.

In the operation of the circuitry of FIG. 2, the first detector pulse exceeding the threshold of the discriminator 48 and commencing within the time interval of the gate pulse from OR gate 54 is passed by linear gate 66 to amplifier 86. Further, gating the 10 microsecond pulse from OR gate 54 with the discriminator 48 output through AND gate 50, provides the trigger for the single shot multivibrator 56. This controls the opening of linear gate 66, rather than triggering the single shot multivibrator 56 from discriminator 48 and gating the single shot multivibrator output and the OR gate pulse for the linear gate control signal. As a result, a detector pulse occurring near the end of the clock pulse interval is passed as a full width pulse instead of being clipped off as would otherwise occur. It should be noted that the multivibrator 64 is reset on the leading edge of the output pulse from multivibrator 56, disabling AND gate 50. Thus, only the first detector pulse occurring during the interval determined by multivibrator 64 is passed by the linear gate 66, with the pulse being outputted full width even when it occurs late within the clock interval.

As hereinabove set forth, the circuit associated with the second gating interval, i.e., discriminator 48, delay line 80 and multivibrators 70 and 72, operate substantially identically with that above described with a different time delay. Multivibrator 70, having a nominal time constant of 25 microseconds, enables the neutron capture radiation to be detected. As above described, only a single pulse is passed when pulses occurring within the gate interval determined by multivibrator 72 are detected. These pulses are passed through the linear gate 66 to the amplifier 86 and the pulse output from linear gate 66 again is full width, even should it occur late within the gate interval.

Figure 3:
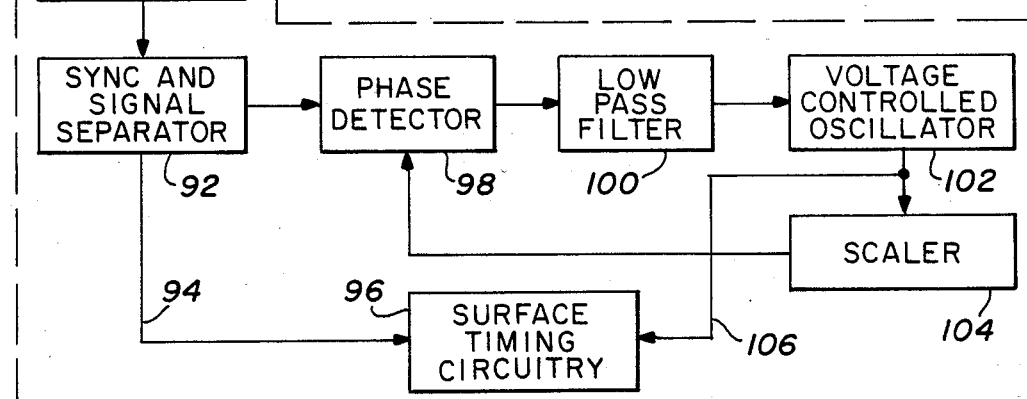
FIG. 3 is a block diagram of a portion of the surface circuitry of the well logging system.

Referring now to FIG. 3, a portion of the surface electronics circuitry 36 is illustrated in greater detail. Pulses from the logging cable are coupled through input terminal 88 into amplifier 90 whose output signal is coupled into a conventional sync and signal separator circuit 92. If the sync and signal pulses are of opposite polarity, they can be separated by polarity-sensitive circuitry and if they are of the same polarity, they can be separated by a voltage discriminator circuit well known in the art. In a preferred embodiment, the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of sync and signal separator 92 by conductor 94 into surface timing circuitry 96 which is described in greater detail hereinafter.

The sync pulses from sync and signal separator circuit 92 are coupled into phase detector circuit 98, the output signal of which is coupled through low pass filter 100 and into voltage controlled oscillator 102. The output signal from voltage controlled oscillator 102 is coupled into scaler 104 and also into surface timing circuitry 96 by conductor 106. The output of scaler circuit 104 is coupled back into phase detector circuit 98.

In the operation, and still referring to FIG. 3, the combined sync and signal pulses are coupled into sync separator 92 where the sync pulses are separated and shaped to provide a reference frequency for phase detector circuit 98. The phase detector output is filtered and used as the controlling voltage for voltage controlled oscillator 102. The oscillator output is scaled by a frequency divider and coupled into the second input of phase detector circuit 98. When the loop is in phase lock, the voltage controlled oscillator output frequency is equal to the product of the reference input frequency and the scaler ratio. Thus, if the subsurface system runs at a clock frequency of 20 kHz and the sync pulses are scaled and transmitted at a 200 kHz rate, a scaler of 100 (scaler 104) will provide a 20 kHz output from the voltage controlled oscillator. This 20 kHz signal, now in phase lock with the subsurface clock, provides the synchronization between the subsurface and the subsurface systems. Thus, it can be seen that this system extends the upper usable pulsing frequency while maintaining a fairly safe margin against random coincidence between the sync pulses and the signal pulses. The design criteria for phase-locked loop systems is well known and specially-designed integrated circuits are available for their implementation.

Figure 4:
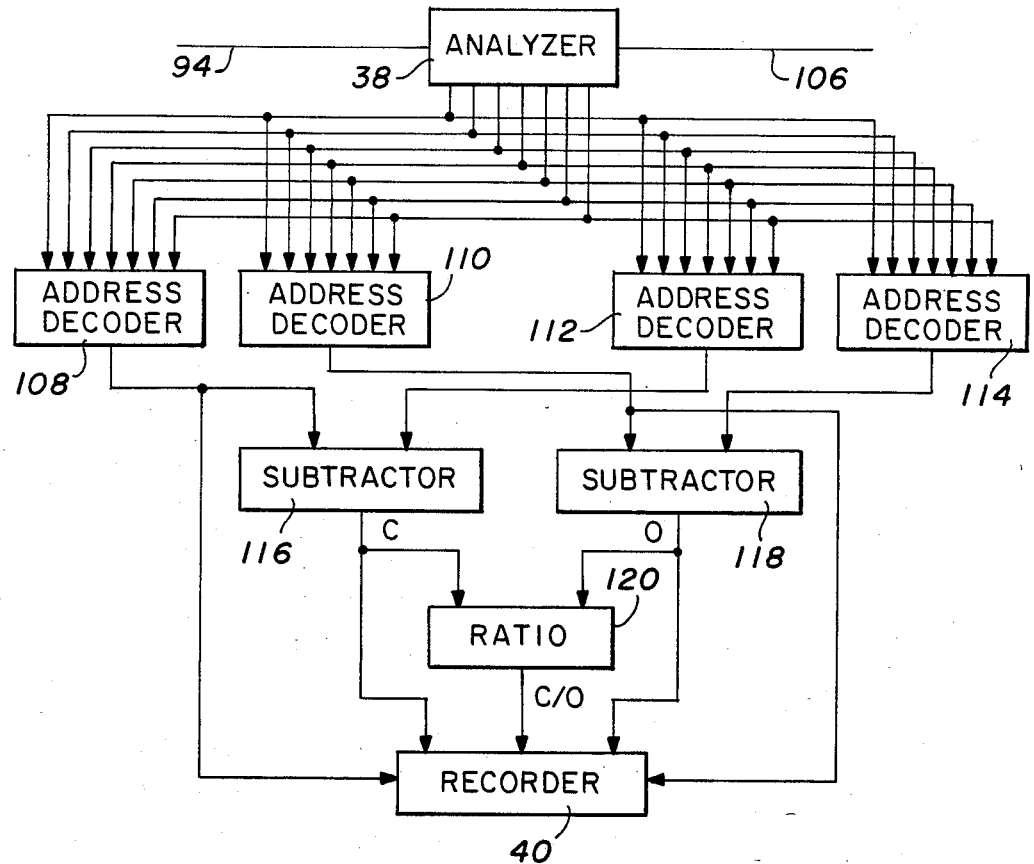
FIG. 4 is a block diagram showing in greater detail a portion of the surface circuitry of FIG. 3.

Referring now to FIG. 4, a portion of the surface electronics including analyzer 38 is shown in greater detail. Conductors 94 and 106, illustrated in FIG. 3, are coupled into multi-channel analyzer 38 having seven outputs which are each connected to the inputs of four address decoders 108, 110, 112 and 114. The outputs of address decoders 108 and 112 are connected to subtractor circuit 116 and output of address decoders 110 and 114 are connected to subtractor circuit 118. Additionally, the outputs of address decoders 108 and 110 are connected to recorder 40. The outputs of subtractor circuits 116 and 118 are connected to ratio circuit 120 and to recorder 40. The output of ratio circuit 120 is coupled to recorder 40. The detailed operation of the multi-channel analyzer and the address decoders is explained in U.S. Pat. No. 4,013,874, issued Mar. 22, 1977, which is incorporated herein by reference.

Figure 5:
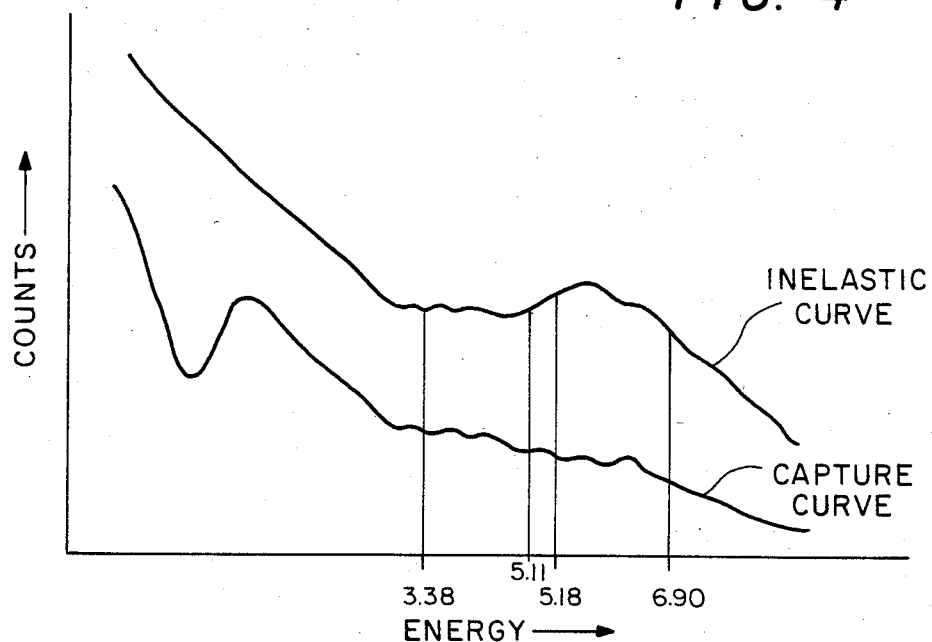
FIG. 5 graphically illustrates a typical spectral inelastic scattering curve and a spectral capture curve showing the energy windows exemplary of the present invention.

In accordance with the present embodiment illustrated and described herein, address decoder 108 is configured to measure pulses functionally related to detected pulses in the 3.38–5.11 Mev energy band of the capture spectrum and address decoder 112 is configured to measure pulses functionally related to detected pulses in the 3.38–5.11 Mev energy band of the inelastic spectrum. Address decoder 110 is configured to measure pulses functionally related to detected pulses in the 5.18–6.90 Mev energy band of the capture spectrum and address decoder 114 is configured to measure pulses functionally related to detected pulses in the 5.18–6.90 Mev energy band of the inelastic spectrum. The preferred measurement intervals are graphically illustrated in FIG. 5, which shows a representative neutron capture curve and a representative inelastically scattered neutron curve.

In the operation of the portion of the surface circuitry shown in FIG. 4, it address decoder 108 provides information functionally related to carbon as derived from the capture spectrum, address decoder 110 provides information functionally related to oxygen as derived from the capture spectrum, address decoder 112 provides information functionally related to carbon as derived from the inelastic spectrum and address decoder 114 provides information functionally related to oxygen as derived from the inelastic spectrum. Subtractor circuit 116 subtracts the capture carbon measurement from the inelastic carbon measurement and subtractor circuit 118 subtracts the capture oxygen measurement from the inelastic oxygen measurement. Ratio circuit 120 combines the inelastic carbon and oxygen measurements to provide a carbon/oxygen ratio which is recorded on recorder 40. Additionally the inelastic carbon measurement and the inelastic oxygen measurement may be recorded on recorder 40 along with the capture carbon and capture oxygen measurements.

Thus, there has been described and illustrated new and improved methods and apparatus for induced gamma ray logging of subsurface formations. However, those skilled in the art will recognize that obvious modifications can be made to the embodiments without departing from the spirit of the present invention.

The embodiments of the invention in which an exclusive property or privilege is claimed are defined as follows:

1. Apparatus for induced gamma ray well logging, comprising:
a source of high energy neutrons for pulsatingly irradiating the regions surrounding a borehole with neutrons sufficient to produce gamma radiation characteristic of carbon and oxygen;
a bismuth germanate scintillator for detecting gamma radiation induced by said irradiating;
a photomultiplier cooperatively coupled to said scintillator for converting said detected gamma radiation into electrical signals;
first circuit means for separating said electrical signals into an inelastically scattered energy spectrum and a capture energy spectrum; and
second circuit means for generating electrical signals functionally related to selected energy ranges substantially restricted to the full-energy photopeaks of the carbon and oxygen within said inelastically scattered spectrum and said capture spectrum, said selected energy ranges comprise the energy bands from between 3.38 to 5.11 Mev and 5.18 to 6.90 MeV.

2. The apparatus of claim 1 further comprising shielding means surrounding said scintillator.

3. The apparatus of claim 2 wherein said shielding means comprises a layer of cadmium surrounding said scintillator.

4. The apparatus of claim 3 wherein said layer of cadmium is from 10 to 20 mils in thickness.

5. Apparatus for detecting elements within earth formations traversed by a borehole by induced gamma ray logging, comprising:
an elongated instrument housing
a source of high energy neutrons cooperatively arranged on said instrument housing;
a pulser coupled to said source for periodically activating said source for irradiating the earth formations;
a bismuth germanate scintillator for detecting induced gamma radiation;
a cadmium shield surrounding said scintillator;
a photomuliplier optically coupled to said scintillator for generating first electrical signals functionally related to said detected radiation;
gating means for deriving from said first electrical signals second electrical signals functionally related to the inelastically scattered radiation energy spectrum and third electrical signals functionally related to the capture radiation energy spectrum;
address decoder means for generating fourth and fifth electrical signals, said fourth signals functionally related to the inelastically scattered energy spectrum signal from between 3.38 to 5.11 MeV and said fifth electrical signals functionally related to the capture energy spectrum from between 3.38 to 5.11 MeV; and
address decoder means for generating sixth and seventh electrical signals, said sixth signals functionally related to the inelastically scattered energy spectrum signal from between 5.18 to 6.90 MeV and said seventh electrical signals functionally related to the capture energy spectrum from between 5.18 to 6.90 MeV.

6. The apparatus of claim 5 further comprising:
first subtractor means for generating eighth electrical signals functionally related to the difference between said fourth and fifth electrical signals; and
second subtractor means for generating ninth electrical signals functionally related to the difference between said sixth and seventh electrical signals.

7. The apparatus of claim 6 further comprising ratio circuit means for generating tenth electrical signals functionally related to a ratio of said eight and ninth electrical signals.

8. The apparatus of claim 7 wherein said cadmium shield is from between 10 to 20 mils in thickness.

9. The apparatus of claim 8 further comprising means for recording said fifth, seventh, eight, ninth and tenth electrical signals.

* * * * *